United States Patent [19]

Zalzal

[11] 4,080,351

[45] Mar. 21, 1978

[54] COMPOSITION AND METHOD FOR DISPERSING HIGH MOLECULAR WEIGHT POLYMERS IN WATER

[75] Inventor: Michael T. Zalzal, Cincinnati, Ohio

[73] Assignee: Chemed Corporation, Cincinnati, Ohio

[21] Appl. No.: 701,316

[22] Filed: Jun. 30, 1976

[51] Int. Cl.² ............................................. C08L 35/00
[52] U.S. Cl. ..................... 260/29.6 PM; 260/29.6 SQ; 260/29.6 Z; 260/29.2 EP
[58] Field of Search ................ 260/29.6 PM, 29.6 SQ, 260/29.6 Z, 29.2 EP

[56] References Cited

U.S. PATENT DOCUMENTS

| 3,402,137 | 9/1968 | Fischer et al. | 260/29.6 H |
| 3,435,618 | 4/1969 | Katzer | 260/29.2 EP |
| 3,839,500 | 10/1974 | Dexter | 260/874 |
| 3,860,526 | 1/1975 | Corbett | 260/29.2 EP |

*Primary Examiner*—M. J. Welsh
*Attorney, Agent, or Firm*—Charles L. Harness

[57] ABSTRACT

This invention provides an improved composition and method for dispersing high molecular weight flocculant polymers and copolymers used for water and waste treatment by means of an effervescing additive.

9 Claims, No Drawings

COMPOSITION AND METHOD FOR DISPERSING HIGH MOLECULAR WEIGHT POLYMERS IN WATER

The present invention relates to a new improved composition and method for dispersing high molecular weight flocculant polymers and copolymers in water using an effervescing additive.

It is well known in the art that high molecular weight polymers, with molecular weights in the range of about 100,000 to about 20 million, are very difficult to disperse or dissolve in water. In dissolving such polymers for use in water treatment, conventionally, dry powdered polymer is fed slowly and carefully into the vortex of a vigorously stirred body of water. However, it is frequently difficult to do this in actual operation for a number of reasons. The desired end result is to completely separate and wet each individual polymer particle so no agglomerated particles form, commonly called fish eyes. Mechanical feeders frequently fail and are less than 100% efficient. By hand, sifting polymers is a highly tedious procedure. Often, for example, personnel tend to simply dump the powder into the water, start up the stirrer and expect the material to dissolve. Under such circumstances the polymers swell and ball up into extremely viscous masses with dry and unswollen material inside which the water cannot even reach to dissolve. Many undissolved, so-called "fish eyes," result. Fish eyes may not necessarily float. Fish eyes may also be found sinking to the bottom of the tank, depending on the density of the fish eyes. Under normal circumstances, it is impossible to get such a mass to completely dissolve even after hours or even days of stirring. For this reason, a considerable amount of work has been done attempting to develop improved and useful methods for producing dispersions and solutions of high molecular weight flocculant polymers in water. Sometimes the dry powdered polymer is wetted with a water soluble organic solvent or it may be wetted with a surface active material in an attempt to improve the penetration into the particles, at the same time acting to separate them. (See, for instance, Dexter, U.S. Pat. No. 3,839,500 and Keas, U.S. Pat. No. 3,817,891) Considerable fractions of water soluble inert salts, such as sodium chloride, may be used in order to separate the particles of polymer and reduce their tendency to ball up into insoluble masses. Mechanical feed devices and eductors operated by flowing water have been described and are commercially used for this purpose. Sometimes such devices work well with cold water, but may give considerable difficulty when used with hot water.

Other attempts to disperse water soluble polymers include water-in-oil emulsion techniques with the polymer disposed in the water phase. This system requires an emulsion and is limited in that relatively low concentrations of water soluble polymers have been prepared in the emulsion. Further, the emulsions of this type often tend to be unstable with time.

The present invention is based upon the discovery that blends of effervesable ingredients and polymers when added to water will effectively wet and disperse the polymer particles into the liquid. This yields polymer particles that are completely wetted, separated and dispersed in water prior to the process or solution.

According to this invention, the polymer particle and effervescing ingredient are compounded. The effervescing ingredient may be any of a number of powders capable of effervescing when added to water, such as powdered acid and powdered carbonate. The powdered acid and powdered carbonate and polymer ratio may vary greatly, depending on the results desired.

The polymers and copolymers which may be used in this invention can be cationic, anionic or nonionic. Commercially available polymers and copolymers of acrylamide, polystyrene, sulfonate, polyethylene oxide and the like, having polymer molecular weights of about 0.1 to 20 million are found useful.

Polymers and copolymers which may be used in the practice of this invention include, for example, polymers and copolymers of acrylamide or methacrylamide, the water soluble salts of acrylic and/or methacrylic acid and copolymers with cationic polyacrylates, such as dialkylaminoalkyl acrylates or methacrylates or quaternized dialkylaminoalkyl acrylates or methacrylates and also copolymers with vinylic monomers.

The copolymers of acrylamide and acrylates may be prepared by copolymerization of the monomers or by partial hydrolysis of the polyacrylamide after polymerization. Other polymerizable vinyl compounds such as vinyl acetate, acrylonitrile, methacrylonitrile, vinyl alkyl ethers, vinyl halides and the like, may be employed as secondary or ternary components of the polymer to impart desired properties to the product.

A number of additives may be also included, for example, inert ingredients, such as sodium chloride, sodium sulfate. Dedusting agents, such as mineral oil or surfactants, may be used to control dust resulting from handling the polymer composition, and buffering agents may be added to control pH.

Based on 100% by weight of formulated polymer and effervescents, the effervescing ingredients are added in an amount from about 1% to about 99% by weight and desirable from about 40% to 70% by weight.

Practice of the present invention will become more apparent from the following examples wherein all parts are given by weight unless otherwise indicated.

EXAMPLE 1

| Anionic Polyacrylamide Polymer | |
|---|---|
| (Polyhall M-295, Steinhall Chem) | 60% |
| Sodium Bisulfate | 20% |
| Sodium Carbonate | 20% |

A mixture of the above ingredients, when added to water, will effectively disperse in water. The dispersion of the polymer is enhanced by the following effervescent action:

$$NaHSO_4 + Na_2CO_3 \rightarrow Na_2SO_4 + H_2CO_3$$

$$H_2CO_3 \rightarrow H_2O + CO_2 \uparrow$$

EXAMPLE 2

The procedure of Example 1 was repeated using:

| Inputs | Percent by Weight |
|---|---|
| Cationic Polyacrylamide | |
| (Percol 292, Allied Colloid) | 60% |
| Sodium Carbonate | 20% |
| Sulfamic Acid | 20% |

$$2HSO_3NH_2 + Na_2CO_3 \rightarrow 2NaSO_3NH_2 + H_2CO_3$$

$$H_2CO_3 \rightarrow H_2O + CO_2 \uparrow$$

The effervescent action of the carbon dioxide generated in the above two samples will cause enough internal agitation to effectively wet and disperse the polymer particles in water.

The solutions so prepared, of course, may be used for any purpose for which polyelectrolytes are usually needed: sludge dewatering, coagulation or flocculation, etc. Among the advantages which are obtained by the practice of this invention are reduction in maintenance and down time since there is less chance of producing thick coatings and deposits of undissolved material in the dissolving tanks which would have to be cleaned out by hand; an increase in capacity because of the ease and speed of preparing the feed solution; more concentrated feed solutions can be prepared if necessary; and lower addition costs since the labor costs are greatly reduced.

It is to be understood that the practice of this invention is not limited to the specific examples given, but may cover any effective equivalent composition. Numerous other modifications will be come apparent to those skilled in the art, and accordingly, it is to be realized that the foregoing description is given merely by way of illustration, and that various modifications may be made therein without departing from the spirit of this invention.

The ingredients of the effervesable component may be varied in order to provide a polymer solution with a most desirable pH. In addition, buffering agents may be added to insure that the final pH of the polymer will fall within a specified optimum range.

What is claimed is:

1. A polymer and effervescent composition, consisting essentially of particles of water-soluble polymer and 1% to 99% powdered effervescents based on the weight of the total formulated product, which when added to water, results in complete separation and dispersion of the polymer particles prior to their dissolution.

2. Composition according to claim 1 in which the polymer is cationic, anionic, or nonionic, and is selected from the group consisting of acrylamide, polystyrene sulfonate, polyethylene oxide, methacrylamide, salts of polyacrylic acid, salts of polymethacrylic acid, and copolymers thereof; said polymer having a molecular weight of about 0.1 to 20 million.

3. The polymer and effervescent composition of claim 1 wherein the effervescent material is present in an amount of about 40% to about 70% by weight.

4. A method of dispersing particles of water-soluble polymer which comprises mixing the polymer with 1-90% of a powdered effervescible ingredient prior to addition of water.

5. Method according to claim 4 wherein the polymer is cationic, anionic, or nonionic, and is selected from the group consisting of acrylamide, polystyrene sulfonate, polyethylene oxide, methacrylamide, salts of polyacrylic acid, salts of polymethacrylic acid, and copolymers thereof; said polymer having a molecular weight of about 0.1 to 20 million.

6. The method of claim 5 wherein the mixture consists essentially of polyacrylamide and effervescent material, whereby when the composition is added to water, the polymer particles are caused to completely separate and disperse prior to dissolving.

7. The method of claim 6 wherein the effervescent material is present in an amount of about 40 to about 70 parts by weight.

8. A polymer and effervescent composition consisting essentially of particles of water-soluble polymer and 1% to 99% of an effervescent material based on the weight of the total formulated product, which when added to water, results in complete separation and dispersion of the polymer particles prior to their dissolution, wherein the effervescent material consists essentially of sodium carbonate and sodium bisulfate.

9. A method of dispersing particles of water-soluble polymer which comprises mixing the polymer with 1% to 99% of an effervescent material prior to the addition of water, said effervescent material consisting essentially of sodium bisulfate and sodium carbonate.

* * * * *